July 14, 1931.  A. M. SNIDER  1,814,974
AUTOMATIC ELECTRIC MIXER
Filed Feb. 2, 1931  2 Sheets-Sheet 1
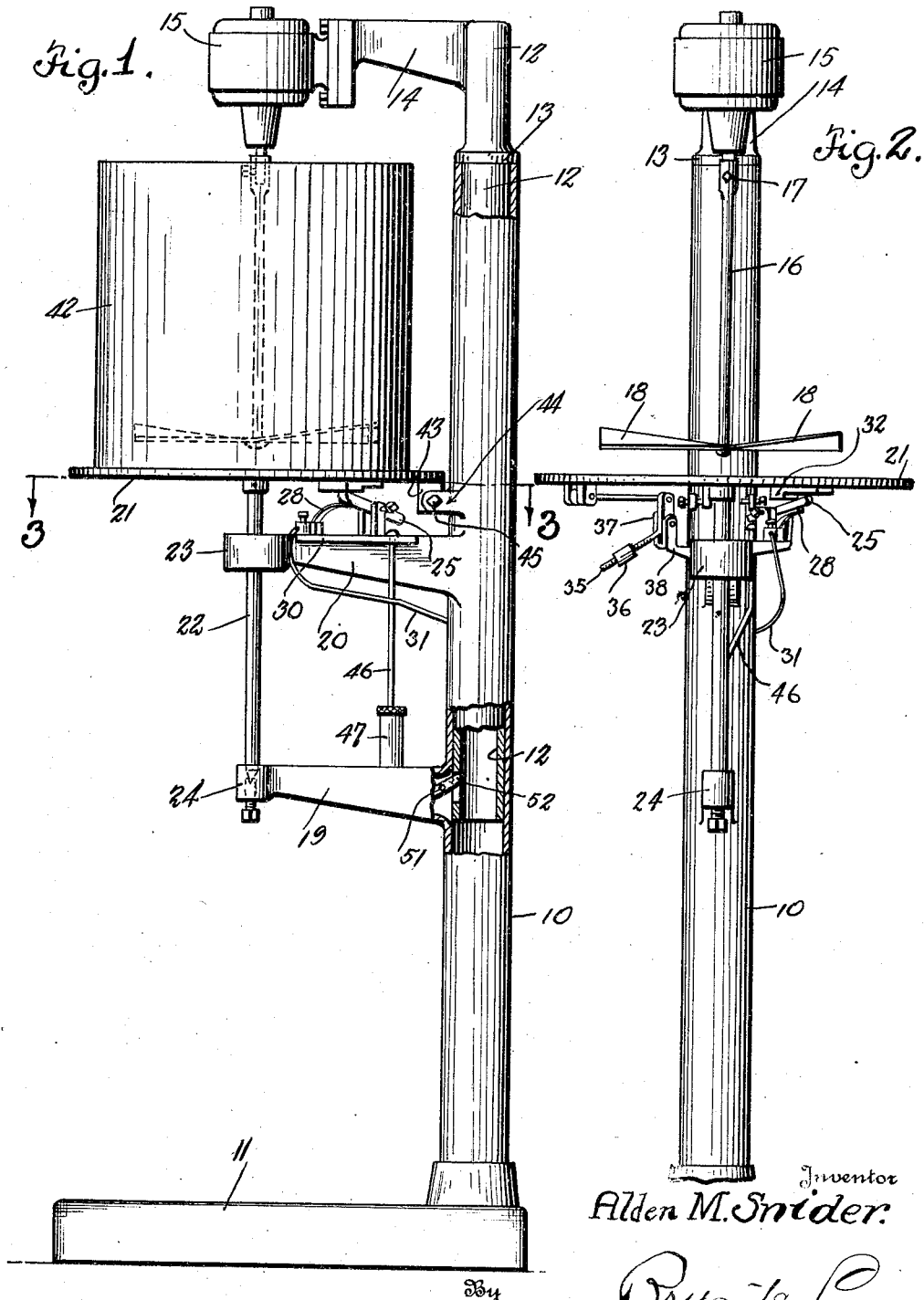

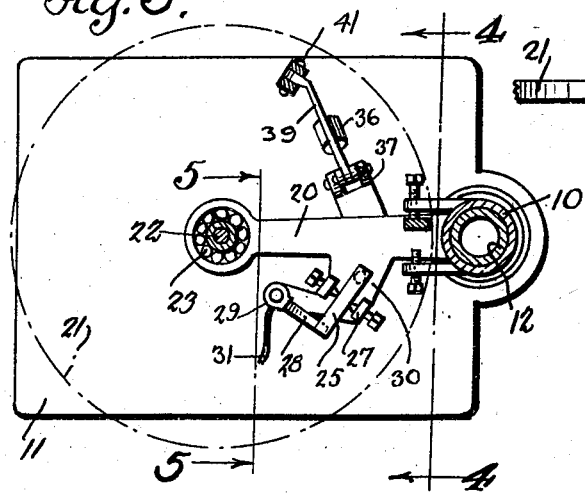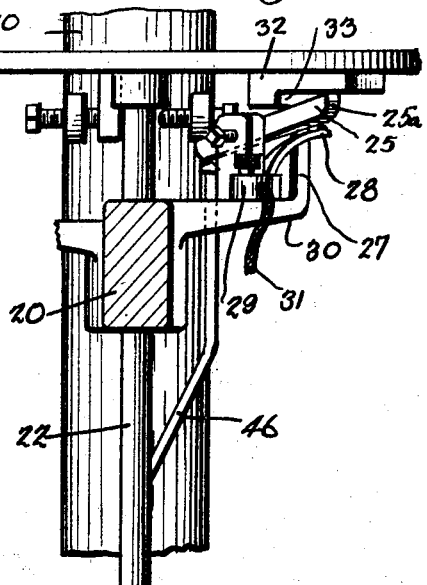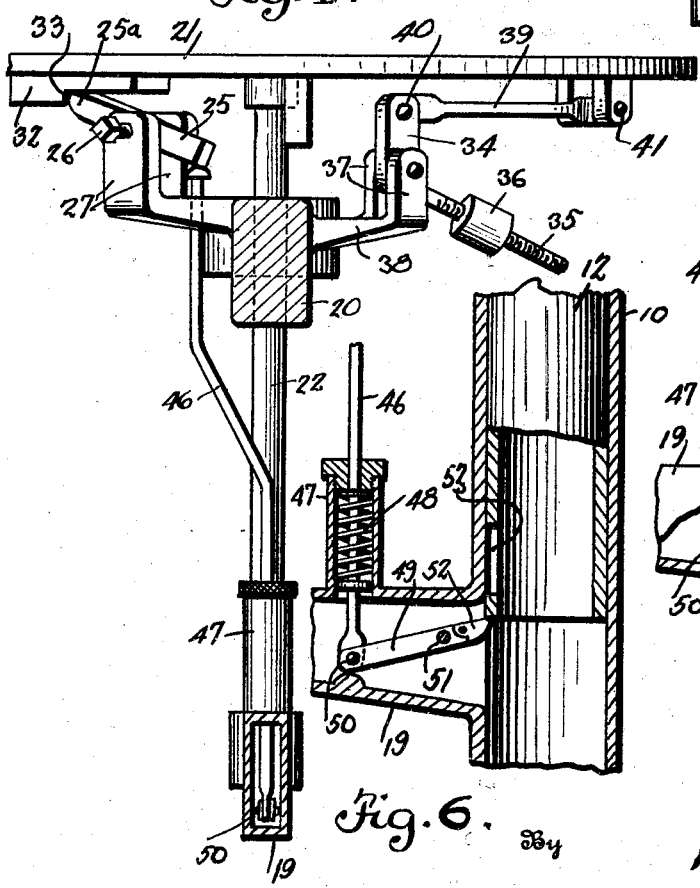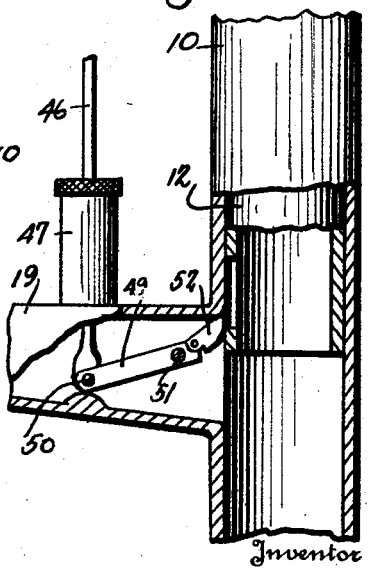

Patented July 14, 1931

1,814,974

UNITED STATES PATENT OFFICE

ALDEN M. SNIDER, OF MANSFIELD, OHIO

AUTOMATIC ELECTRIC MIXER

Application filed February 2, 1931. Serial No. 512,984.

This invention relates to certain new and useful improvements in automatic electric mixers.

The primary object of the invention is to provide an automatic electric mixer especially designed for the whipping of cream and similar fluid wherein a switch device associated with the motor of the mixer is closed when the motor carrying the mixing or whipping blade is lowered into a receptacle, the switch device being automatically opened by centrifugal force resulting from resistance offered to the mixing or whipping blade by the whipped material in the receptacle.

A further object of the invention is to provide a cream whipper of the foregoing character embodying a counter-balance weight or governor controlling opening movement of the switch whereby different degrees of consistency of the whipped material may be obtained.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view, partly in section of an automatic electric mixer or cream whipper constructed in accordance with the present invention, the electric switch for the motor being shown in closed position;

Figure 2 is a front elevational view showing the table for the support of the cream receptacle and the counter-balance weight or governor associated with the table for rotating the same a limited distance to effect closing of the switch device;

Figure 3 is a horizontal sectional view taken on line 3—3 of Figure 1 showing devices for limiting rotary movement of the receptacle support, the governor and the switch device;

Figure 4 is a cross-sectional view taken on line 4—4 of Figure 3 showing one of the switch elements in open position and the adjustable counter-balance weight or governor for rotating the receptacle support;

Figure 5 is a cross-sectional view taken on line 5—5 of Figure 3 showing the switch device in closed position;

Figure 6 is a detail sectional view showing the operating devices for the switch arm constructed to cause operation of the switch arm by movement in one direction; and Figure 7 is a detail sectional view showing the switch arm unaffected by movement of the devices in the other direction.

Referring more in detail to the accompanying drawings, there is illustrated an automatic cream whipper comprising a tubular standard 10 perpendicularly rising from a supporting base plate 11, a tubular post 12 being reciprocably mounted in the standard 10 and having an annular shoulder 13 adjacent its upper end to limit downward movement of the post in the standard. A laterally directly bracket arm 14 carried by the upper end of the post 12 supports an electric motor 15, the shaft of which has the shank 16 of a mixer, beater or whipper detachably connected thereto as at 17 the shank 16 of the whipper depending from the motor 15 and disposed parallel to the standard 10, the same carrying a horizontal whipper blade 18 at its lower end.

A pair of spaced vertically aligned brackets 19 and 20 project from one side of the standard 10 providing supports for a disk table 21 having an axial bearing shaft 22 depending therefrom, the shaft 22 extending through a ball bearing race 23 at the outer end of the bracket 20 while the lower end of the shaft 22 has an end thrust bearing 24 in the outer end of the bracket 19 as clearly shown in Figures 1 to 3.

The switch device for controlling operation of the motor 15 includes a lever or dog 25 pivotally mounted as at 26 in upstanding lugs 27 carried by the bracket 20 beneath the disk table 21, the other element of the switch comprising a spring arm 28 carried by a block 29 on the arm 30 extending from the bracket 20 and having an electric conductor 31 leading to a source of electric energy.

Devices are provided for maintaining the switch elements 25 and 28 separated and include an insulation block 32 secured to the underside of the disk table 21 and having a shoulder 33 with which the end 25a of the switch element or dog 25 is engaged, the pivot point 26 of the switch dog 25 being located at one side of the center of gravity whereby the end 25a of the switch dog is normally directed upwardly to the position shown in Figure 4. To maintain the switch dog 25 engaged with the shoulder 33 of the insulation block 32 and spaced from the switch element 28, a counter-balance weight or governor is associated with the disk table tending to move the latter in a direction whereby the shoulder 33 will have binding engagement with the end 25a of the switch dog. The counter-balance weight or governor as shown more clearly in Figure 4, comprises a bell crank lever having an upstanding arm 34 and a declined screw rod 35 upon which an adjustable weight 36 is mounted, the bell crank lever being pivoted between the upstanding lugs 37 carried by an arm 38 projecting from the bracket 20. A rod 39 is pivotally connected as at 40 to the upper end of the arm 34 with its other end pivotally engaged with a pair of lugs 41 depending from the disk table 21 at that side of the shaft 22 opposite the switch dog 25. It will be observed that the counter-balance weight or governor 36 by its engagement with the disk table 21 tends to move the latter in a direction to cause binding engagement of the insulation block 32 with the switch dog 25.

The post 12 is reciprocable within the tubular standing 10 and when raised in said standard to displace the whipping blades 18 from proximity of the disk table 21, a receptacle 42 is mounted upon said table, the post 12 being then lowered for disposing the whipping blade 18 within the receptacle. During lowering movement of the post, the switch dog 25 is disengaged from the shoulder 33 of the insulation block 32 and upon said disengagement, the counter-balance weight 36 operates the bell crank lever of which the same forms a part for rotating the disk table a limited distance to displace the end 25a of the switch dog from engagement with the block shoulder 33, the switch dog being then engaged with the lower face of the insulation block 32 laterally of the shoulder 33 and in engagement with the other switch element 28. Rotary movement in opposite directions of the disk table 21 is limited by the lug 43 depending from the peripheral edge thereof and disposed between ears 44 carried by the tubular standard 10 and in which ears adjustable screws 45 are mounted to engage said lug for limiting movement. The devices for disengaging the switch dog 25 from the insulation catch block 32 include a rod 46 having its upper end extending through the arm 30 on the bracket 20 beneath the overbalanced end of the switch dog 25. The lower end of the rod 46 extends through a housing 47 rising from the bracket 19, the lower end of the rod 46 being tensioned in a downward direction by the coil spring 48 associated therewith within the housing 47. The bracket 19 is of hollow formation as shown in Figures 1, 6 and 7 and is in open communication with the tubular standard 10, the lower end of the rod 46 extending through the housing 47 and into the bracket 19 and having a lever 49 pivotally connected to its lower end as at 50, the lever 49 being pivotally mounted as at 51 within the bracket 19 and having a hinged nose 52 extending into the tubular standard in the path of movement of the lower end of the post 12. A slotted opening 53 is provided in the lower end of the tubular post 12 and extends lengthwise thereof for the reception of the lever nose when the post is in its completely lowered position.

Assuming that the switch dog 25 is engaged with the insulation catch block 32 as shown in Figure 4, the post 12 which had been elevated to permit mounting of the receptacle 42 upon the table 21, the post 12 is then lowered and during such movement, the lower end thereof engages the nose 52 of the lever 49 for moving the latter on its pivot 51 to elevate the rod 46 against the tension of the spring 48, the upper end of the rod engages the overbalanced end of the switch dog to free the latter from engagement with the catch block 32, whereupon the counter-balance weight will shift the table 21 a limited distance controlled by the stop lug 43 and associated pins 45 to position the end 25a of the switch dog laterally of the shoulder 33 and in engagement with the switch element 28, continued downward movement of the post 12 which is limited by the shoulder 13 on the upper end thereof, positioning the slot 52 therein to receive the nose 52 of the lever 49. The motor 15 is thereby set into operation and such operation continues until the degree of consistency of the whipped cream has reached that point in which resistance will be offered to the whipping blade 18 whereupon the force of the whipping blade against the whipped cream will tend to rotate the receptacle 42 and disk table 41 in a reverse direction to break connection between the switch elements 25 and 28 and permit the end 25a of the switch dog to be again engaged with the shoulder 33 of the catch block 32, the degree of consistency of the whipped cream and the operation of rotating the table 21 against the power of the counter-balance weight or governor being determined by the position of the weight 36 upon the screw rod 35 of the bell crank lever. By adjusting the weight 36 upon the screw rod 35, more or less resistance is offered to the reverse rotation of the table 21 so that the degree of consistency of the whipped cream may be easily predetermined with the result that the switch device is automatically operated for cutting off the motor when cream has been whipped to the desired consistency. With the post 12 at its limit of downward movement and the nose 52 of the lever 49 projecting into the slot 52, the spring 48 associated with the rod 46 lowers said rod out of the path of movement of the over balanced end of the switch dog 25. Upward movement of the post 12 is accomplished without effecting operation of the rod 46 as the nose 52 of the lever 49 will move on its pivot as shown in Figure 7.

While there is herein shown and described the preferred embodiment of the invention it is nevertheless to be understood that minor changes may be made therein without departing from the spirit and scope of the invention as claimed.

I claim:—

1. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, and means operated during lowering movement of the post to disengage the switch element engaged with the table and move the same into engagement with the other switch element.

2. In apparatus of the character described a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, means operated during lowering movement of the post to disengage the switch element engaged with the table and move the same into engagement with the other switch element, the switch element engaged with the table comprising a pivoted dog and a shouldered insulation block on the table engaged by the dog.

3. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, and means operated during lowering movement of the post to disengage the switch element engaged with the table and move the same into engagement with the other switch element, the table rotating means including an adjustable counterbalance weight having a link arm connection with the table to rotate the latter when the switch element engaged with the table is disengaged therefrom.

4. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, means operated during lowering movement of the post to disengage the switch element engaged with the table and move the same into engagement with the other switch element, the switch element engaged with the table comprising a pivoted dog and a shouldered insulation block on the table engaged by the dog, the table rotating means including an adjustable counterbalance weight having a link arm connection with the table to rotate the latter when the switch element engaged with the table is disengaged therefrom.

5. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, and means operated during lowering movement of the post to disengage the switch element engaged with the table and move the same into engagement with the other switch element, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post.

6. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, means operated during lowering movement of the post to disengage the switch element engaged with the table and move the same into engagement with the other switch element, the switch element engaged with the table comprising a pivoted dog and a shoulder insulation block on the table engaged by the dog, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post.

7. In apparatus of the character described, a tubular standard, a post reciprocable therein and carrying an electric motor, a whipping blade operatively carried by the motor, a table mounted on the standard and having limited rotary movement, switch elements for the motor mounted on the standard, means on the table to influence rotary movement in one direction, means on the table to be engaged by one of the switch elements for holding the table against rotary movement with the switch elements separated, and means operated during lowering movement of the post to disengage the switch element engaged with the table and move the same into engagement with the other switch element, the table rotating means including an adjustable counterbalance weight having a link arm connection with the table to rotate the latter when the switch element engaged with the table is disengaged therefrom, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post.

8. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, means operated during lowering movement of the post to disengage the switch element engaged with the table and move the same into engagement with the other switch element, the switch element engaged with the table comprising a pivoted dog and a shouldered insulation block on the table engaged by the dog, the table rotating means including an adjustable counterbalance weight having a link arm connection with the table to rotate the latter when the switch element engaged with the table is disengaged therefrom, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post.

9. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, and means operated during lowering movement of the post to disengage the switch element engaged with the table and move the same into engagement with the other switch element, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post, the table being reversely rotatable in opposition to the table rotating means in the presence of resistance offered the whipping blade for separating the switch elements with one switch element moved into engagement with the table for holding the table against rotation by the table rotating means.

10. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one direction, means on the table to be engaged by one of the switch elements for holding the table against rotary movement with the switch elements separated, means operated during lowering movement of the post to disengage the switch element engaged with the table and move the same into engagement with the other switch element, the switch element engaged with the table comprising a pivoted dog and a shouldered insulation block on the table engaged by the dog, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post, the table being reversely rotatable in opposition to the table rotating means in the presence of resistance offered the whipping blade for separating the switch elements with one switch element moved into engagement with the table for holding the table against rotation by the table rotating means.

11. In apparatus of the character described, a tubular standard, a post reciprocable therein and carrying an electric motor, a whipping blade operatively carried by the motor, a table mounted on the standard and having limited rotary movement, switch elements for the motor mounted on the standard, means on the table to influence rotary movement in one direction, means on the table to be engaged by one of the switch elements for holding the table against rotary movement with the switch elements separated, and means operated during lowering movement of the post to disengage the switch element engaged with the table and move the same into engagement with the other switch element, the table rotating means including an adjustable counterbalance weight having a link arm connection with the table to rotate the latter when the switch element engaged with the table is disengaged therefrom, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post, the table being reversely rotatable in opposition to the table rotating means in the presence of resistance offered the whipping blade for separating the switch elements with one switch element moved into engagement with the table for holding the table against rotation by the table rotating means.

12. In apparatus of the character described, a tubular standard, a post reciprocable therein and carrying an electric motor, a whipping blade operatively carried by the motor, a table mounted on the standard and having limited rotary movements, switch elements for the motor mounted on the standard, means on the table to influence rotary movement in one directon, means on the table to be engaged by one of the switch elements for holding the table against rotary movement with the switch elements separated, means operated during lowering movement of the post to disengage the switch element engaged with the table and move the same into engagement with the other switch element, the switch element engaged with the table comprising a pivoted dog and a shouldered insulation block on the table engaged by the dog, the table rotating means including an adjustable counterbalance weight having a link arm connection with the table to rotate the latter when the switch element engaged with the table is disengaged therefrom, the means operated by the post including a tensioned rod positioned for engagement with the table engaged switch element, a lever connected to the lower end of the rod and extending into the path of movement of the post to be operated by the post upon lowering movement thereof for raising the rod and operating the switch element associated therewith and being unaffected by upward movement of the post, the table being reversely rotatable in opposition to the table rotating means in the presence of resistance offered the whipping blade for separating the switch elements with one switch element moved into engagement with the table for holding the table against rotation of the table rotating means.

13. In cream whipping apparatus, a table supported for limited rotary movements, counterbalancing means for rotating the table in one direction, a whipping blade to effect reverse rotation of the table in the presence of resistance offered the blade, a motor for operating the whipping blade and switch devices for the motor controlled by rotation of the table.

14. In cream whipping apparatus, a table supported for limited rotary movements, means for rotating the table in one direction, a whipping blade to effect reverse rotation of the table in the presence of resistance offered the blade, a motor for operating the whipping blade and switch devices for the motor controlled by rotation of the table.

In testimony whereof I affix my signature.

ALDEN M. SNIDER.